June 15, 1954
A. SAVITZKY ET AL
2,680,989
RECORDING SPECTROMETER
Filed Dec. 22, 1950
3 Sheets-Sheet 1
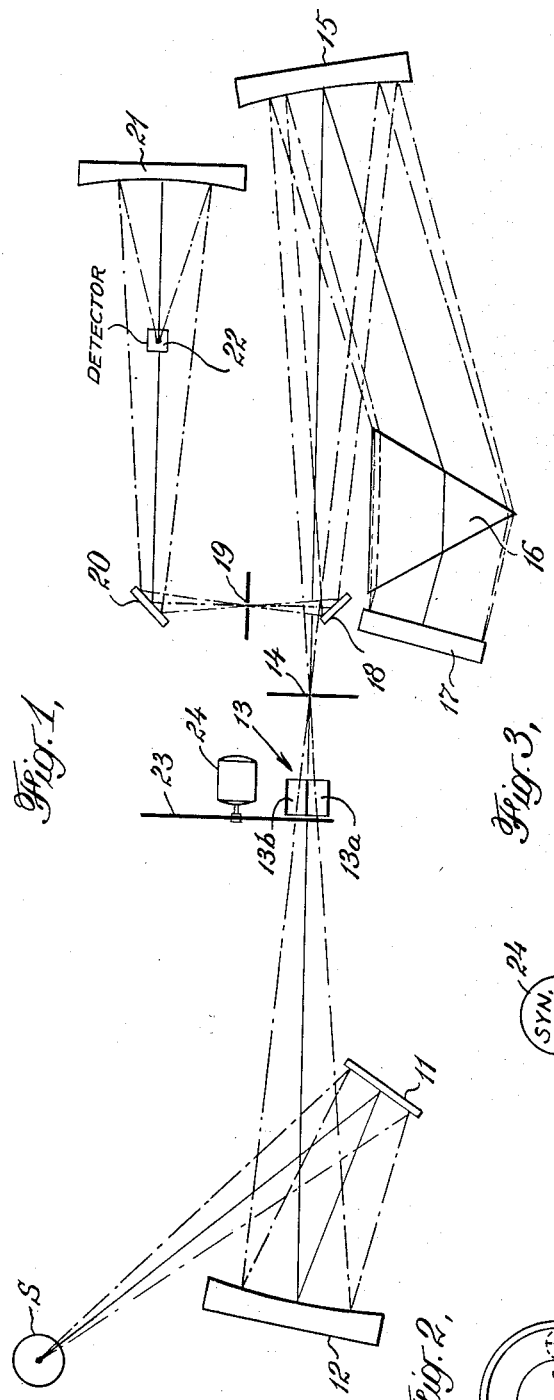
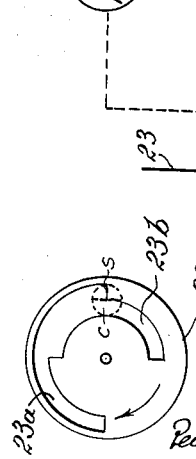
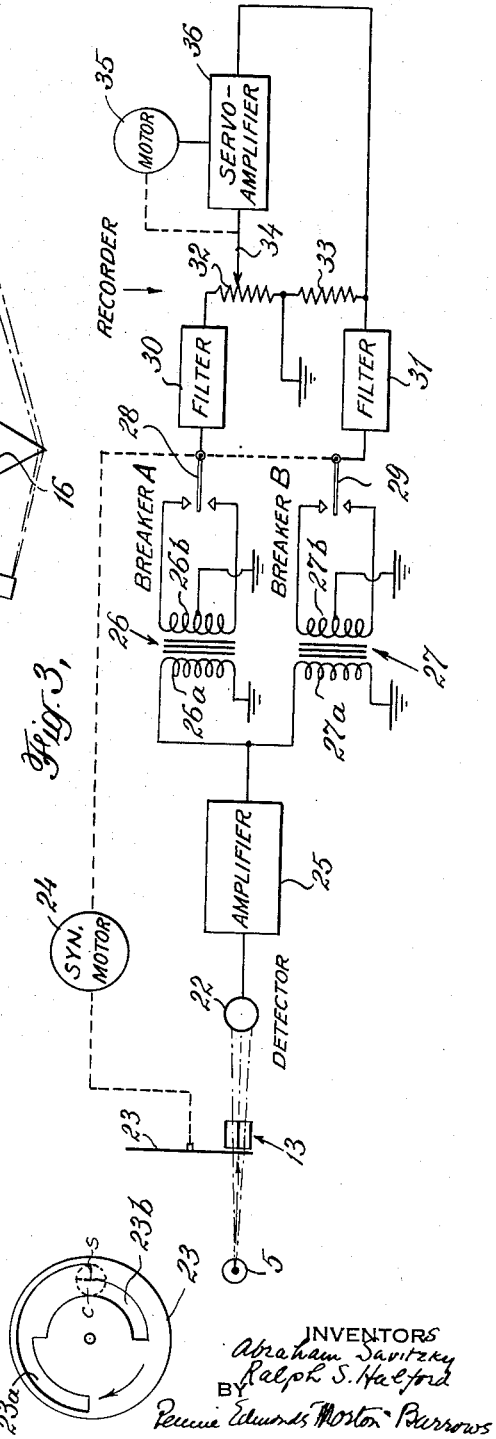
INVENTORS
Abraham Savitzky
Ralph S. Halford
BY
Pennie Edmonds Morton Barrows
ATTORNEYS June 15, 1954  A. SAVITZKY ET AL  2,680,989
RECORDING SPECTROMETER
Filed Dec. 22, 1950  3 Sheets-Sheet 2
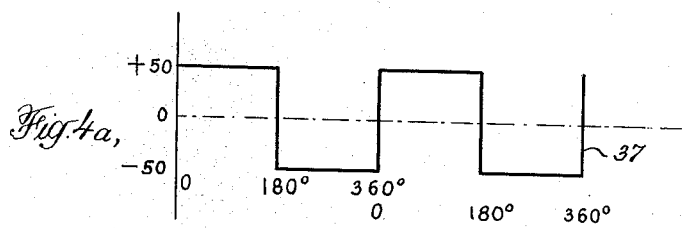
Fig.4a,
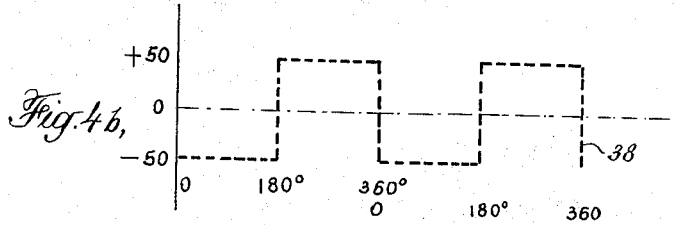
Fig.4b,
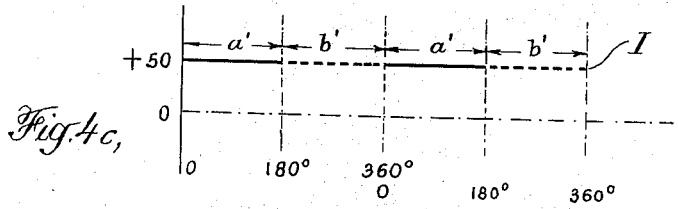
Fig.4c,
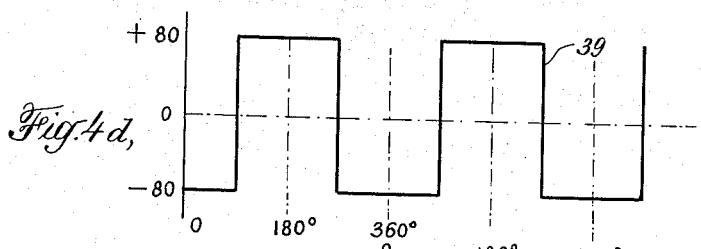
Fig.4d,
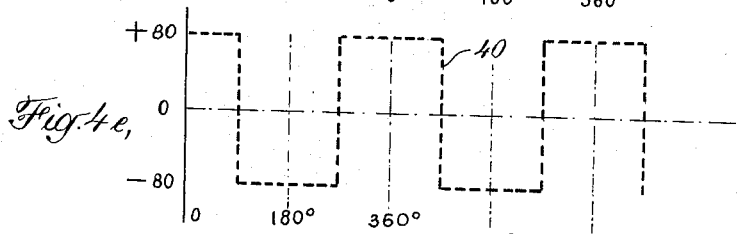
Fig.4e,
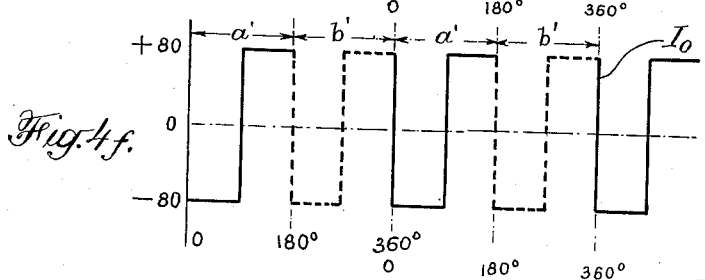
Fig.4f.
INVENTOR
Abraham Savitzky
Ralph S. Halford
BY
Pennie Edmonds Morton Barrows & Taylor
ATTORNEYS

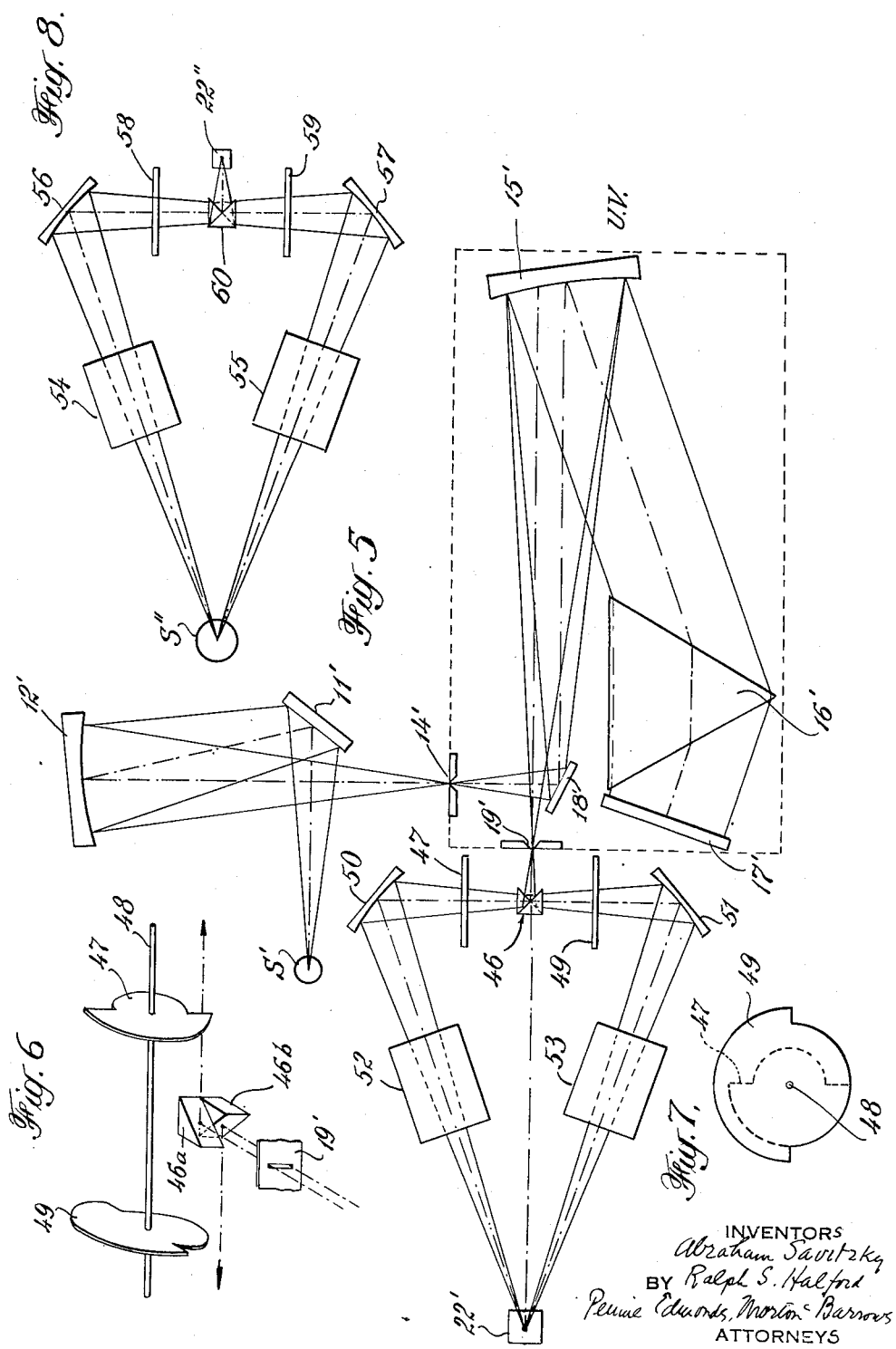

Patented June 15, 1954

2,680,989

UNITED STATES PATENT OFFICE 2,680,989

RECORDING SPECTROMETER

Abraham Savitzky, Norwalk, Conn., and Ralph S. Halford, New York, N. Y., assignors to The Perkin-Elmer Corporation, Glenbrook, Conn., a corporation of New York Application December 22, 1950, Serial No. 202,276

14 Claims. (Cl. 88—14)

This invention relates to spectrometers, such as are commonly used to measure absorption spectra in the infrared range in analytical work. More particularly, the invention is concerned with a novel instrument, by means of which the ratio of the intensities of two different kinds of radiation may be determined. A specific form of the new instrument may be a spectrophotometer, in which a comparison may be readily made between spectra obtained by passing radiant energy through a cell containing a sample to be examined and a cell containing a reference or comparison specimen. The new instrument is of relatively simple construction and the comparison between the spectra is made in a single run. The instrument thus affords the advantages of both single and double beam spectrometers used for spectrophotometric work, while avoiding their disadvantages. The instrument includes means for separating two light signals out of phase by approximately 90° and such means form part of the invention.

The instrument of the invention may be employed in the infrared, visible, and ultraviolet ranges and is especially useful in the infrared region. A form of embodiment of the invention utilizing radiation from an infrared source will, accordingly, be illustrated and described in detail for purposes of explanation. In the preferred form of such an instrument, the ratio of the absorptions of the sample to be examined and the comparison sample are automatically recorded throughout the run.

Spectrophotometers heretofore available fall into two classes depending upon whether they make use of a single beam of radiation or a double beam. In making a comparison of the spectra of a sample to be examined and a comparison or reference specimen in a single beam instrument, two runs are made in succession and these runs are intended to be identical in all respects except that, in one run, the beam is intercepted by the unknown and, in the other, the unknown is replaced by the standard. The ratios of the absorption by the unknown and the standard are then calculated point by point throughout the wavelengths employed in the runs. The use of a single beam instrument for the purpose described is open to serious objections, as, for example, the running time is often very long. Also, the validity of the procedure is based on the assumption that the instrumental conditions in the two runs are identical and it is extremely difficult to maintain constant the brightness of the source, the temperature of the dispersing element, and other important factors. The introduction of errors in measurement resulting from variations in the conditions in the two runs can, accordingly, be avoided only by the utmost care.

Modifications in single beam instruments have heretofore been proposed, and such modifications have consisted primarily of the use of memory devices for storing information in a no-sample or standard run, the information then being fed into the instrument during the sample run, so that ratioing may be accomplished automatically and the ratios recorded. While such modifications would overcome some of the disadvantages of single beam operation, they would not avoid the necessity of making two runs with the possible errors resulting from changes in conditions during the runs.

In instruments operating with a double beam, the sample and the comparison are transilluminated simultaneously from the same source and as nearly as possible through the same optics. The records of the two beams are then available simultaneously and may be ratioed automatically in a number of ways. One way commonly used is to weaken the comparison beam by motor-driven devices, until it is equal to the sample beam, and then record the weakening effort required. Such instruments are, however, very complex mechanically, optically, and electronically and, in general, the strength of the unabsorbed beam is not available to operate desired auxiliary devices.

The present invention is directed to the provision of a novel instrument, which affords the advantages of simultaneous measurement of the comparison and sample absorption spectra and the ratioing of the measurements. The new instrument is comparable in simplicity to a single beam instrument of ordinary construction and, in addition, it makes available the strength of an unabsorbed beam for operation of auxiliary devices.

In the preferred form of the new instrument, the radiation from the source is passed to a pair of cells, one of which contains the sample and the other the comparison. The radiation transmitted by the sample and the comparison falls upon a detector and the radiation is interrupted or chopped periodically. Each beam is interrupted in a cycle having an on period and an off period and the two cycles are displaced by a phase difference of 90°. The detector responds to the radiation falling thereon, as by generating a voltage, and the detector signal made up of two components is amplified and the amplifier output is passed to a pair of rectifying and filtering means. One of the rectifying and filtering means operates approximately in phase with the first component of the signal and 90° out of phase with the second component, while the other rectifying and filtering means operates approximately in phase with the second component and 90° out of phase with the first. Each rectifying and filtering means thus rectifies the component of the signal, with which it is in phase, and rejects, that is, produces no D. C. output from the other component. The two rectified signals are proportional in amplitude to the radiation transmitted to the detector through the two cells and thus proportional to the radiation transmitted by the sample and the comparison. The two cycles of operation in the instrument each have an off period greater than 90° and, since the cycles are out of phase by 90°, the result is that the cycles have an off period in common. As a consequence, a zero point is provided and the actual value of the two rectified signals can be determined. Once the signals are separated as described, they may be ratioed and recorded as by being fed to a servo-amplifier operating the motor of a ratio recorder.

For a better understanding of the invention, reference may be made to the accompanying drawings, in which Fig. 1 is a diagrammatic plan view of the new instrument;

Fig. 2 is a view in front elevation of the disc used for chopping the beam in the instrument;

Fig. 3 is a diagram of the electrical circuits;

Figs. 4a–4f, inclusive, are diagrams showing the mode, in which the rectifying means function;

Fig. 5 is a diagrammatic plan view of another form of instrument embodying the invention;

Fig. 6 is a view in perspective of features of the instrument of Fig. 5;

Fig. 7 is an end elevational view of the chopping discs used in the Fig. 5 instrument; and Fig. 8 is a diagrammatic plan view of another modified form of the new instrument.

The instrument, as illustrated in Figs. 1 and 2, is for infrared operation and it includes a source S of infrared radiation, the source being of any well known type, such as that known commercially as a "globar." Light from the source passes to a flat mirror 11, which directs the light to a spherical mirror 12, which focuses the light through the cell 13 upon an entrance slit 14 of a monochromator. The light passing through the slit falls upon and is collimated by an off-axis paraboloid 15, from which the beam passes through a prism 16 to be dispersed and thence to an adjustable flat mirror 17. The light returns from mirror 17 through the prism to be dispersed further and to the paraboloid 15, which focuses the light upon an exit slit 19 of the monochromator, the light being turned on its way to the slit by a diagonal mirror 18. The rays passing through the exit slit fall upon a flat mirror 20 and are directed thereby upon a focusing mirror 21. Light is focused by mirror 21 upon a detector 22 and, by adjustment of mirror 17, light in different narrow bands of wavelengths may be directed upon the detector. The detector is of the type, which produces a response to the radiation falling thereon, and any well known detector appropriate for receiving the radiation supplied by the source may be used. In the instrument illustrated, the detector responds to the radiation falling thereon by generating a voltage.

The cells employed in the instrument are of conventional construction and may take the form of a housing provided with a partition dividing it into two cells 13a, 13b for containing the sample to be examined and the standard or comparison, respectively. The housing has windows transparent to the radiation at its opposite ends and the partition extends in the direction of travel of the radiation. The cells may be said to be offset laterally, by which it is to be understood that radiation passing through each cell falls upon the detector without passing through the other cell.

The beam of radiation about to enter the cells is chopped by a disc 23 mounted on the shaft of a motor 24. The disc is formed with two arcuate slots 23a, 23b lying offset radially, each slot in the disc shown having a length of 180° and the slots having an overlap of 90°. The disc and cells are so disposed relatively to one another that, in each revolution of the disc, light from the source passes first through one cell only, then through both cells, then through the second cell only, and is then cut off.

The voltage generated by the detector passes to an amplifier 25 and is then rectified and filtered, as follows. The output of the amplifier is fed to the primaries 26a, 27a of a pair of transformers 26, 27. The secondary 26b, 27b of each transformer has a grounded center tap and the ends of secondary 26b are connected to the fixed contacts or poles a, b of a breaker A, while the ends of secondary 27b are connected to the fixed contacts or poles a', b' of a breaker B. Breaker A has a movable arm 28 engageable with its poles and breaker B has a similar movable arm 29 engageable with its poles. The arms 28, 29 are connected to respective filters 30, 31, which remove undesired A. C. components from the rectified signals. The filters are connected to a rationing recording device, which, in the diagram, includes a potentiometer 32 and a resistor 33 connected to the respective filters and to a common ground. The slider 34 of the potentiometer carries a pen making a record on a record strip and is actuated by a motor 35 supplied with current from a servo-amplifier 36 of conventional construction connected to the slider and to the output terminal of filter 31.

The movable arms 28, 29 of the breakers A, B are driven in synchronism with the chopper disc 23 and are preferably actuated by the motor 24. The breakers operate in cycles in synchronism with the chopper disc 23, as follows.

Breaker A is synchronized with the inner slot 23b of the disc and, when radiation is passing through that slot, arm 28 of the breaker is in contact with pole a of the breaker. During the other half of the revolution of the chopper disc, arm 28 is in contact with pole b of the breaker. Breaker B is 90° out of phase with breaker A and is synchronized with the outer slot 23a in the disc. Accordingly, when radiation is passing through the outer slot, arm 29 of breaker B is in contact with pole a' of the breaker, and, for the second half of the revolution of the chopper disc, arm 29 is in contact with pole b' of the breaker.

The signal reaching each breaker is made up of two components produced by radiation passing through the respective slots. The components are 90° out of phase, as are also the breakers. Accordingly, one component of the signal reaching a breaker is in phase with the breaker and the other is 90° out of phase with the breaker. The solid line 37 in Fig. 4a represents the in phase components of the signal appearing at pole a' of breaker B and the broken line 38 in Fig. 4b represents the same signal as it appears at pole $b'$ of the breaker. The arm 29 of the breaker is in contact with pole $a'$ during the interval 0–180° and the breaker then transmits that part of the signal represented by the part of line 37 beween 0 and 180°. When the arm is in contact with pole $b'$ of the breaker during the alternate half cycle 180°–360°, the breaker transmits that part of the signal represented by the part of line 38 between 180° and 360°.

As a result of the action of breaker B as above described, it transmits a rectified signal I shown in Fig. 4c. The signal I is a D. C. signal proportionate to the in phase radiation. The signal is made up of alternate sections $a'$, $b'$ corresponding to intervals when arm 29 was in contact with poles $a'$, $b'$, respectively. As the outer slot 23a in the chopper disc transmits radiation passing through the sample S, the signal I represents transmission by the sample and has been shown as having a value of 50 arbitrary units.

The solid line 39 represents the out of phase component as it appears at pole $a'$ of breaker B and the broken line 40 represents the same signal as it appears at pole $b'$. As a result of the operation of arm 29, the out of phase signal is transmitted by the breaker as the signal $I_0$ shown in Fig. 4f. Signal $I_0$ is an A. C. signal having no D. C. component and it is, therefore, completely removed by filter 31.

The breaker A operates in the same manner as breaker B but 90° out of phase therewith. As a result, the signal I produced by breaker A in response to radiation passing through the outer slot is an A. C. signal and is not passed by filter 31 but rejected. The signal $I_0$ produced by breaker A in response to radiation passing through the inner slot is the in phase signal and it is a D. C. signal, which represents transmission by the comparison c and may be 80 arbitrary units.

The D. C. signals I and $I_0$ passed by the filters 30, 31 to the recording device result in the slider 34 of potentiometer 32 moving its pen to make a record of the ratio of the signals. Under the conditions assumed with signal I equal to 50 arbitrary units and signal $I_0$ equal to 80 such units, the ratio of the transmission of the sample for the wavelength used is recorded as 50/80=62.5%. The ratio of the absorption of the sample to that of the comparison is then 37.5% and either ratio may be recorded by adjustment of the recorder.

The new instrument in the form shown in Figs. 5–7, inclusive may be advantageously employed in the ultra-violet field and it includes a suitable source S' of ultra-violet radiation. A flat mirror 11' receives the radiation and directs it to a spherical mirror 12', which focuses the radiation upon the entrance slit 14' of a monochromator. The light passing through the slit falls upon a flat mirror 18', from which is passes to an off-axis paraboloid 15' passing a collimated beam through a prism 16' for dispersion. The dispersed beam passes to an adjustable flat mirror 17', from which it returns through the prism for further dispersion to the paraboloid. The light is focused by the paraboloid upon the exit slit 19' and, upon issuing from the slit, falls upon a biprism 46, comprising a pair of right angle prisms lying in contact with their hypotenuse faces so placed that the two halves of the beam issuing at opposite ends of the slit strike the respective prisms and are reflected in opposite directions.

The beam reflected by the upper prism 46a (Fig. 6) is periodically interrupted or chopped by a disc 47 on a driven shaft 48, while the beam reflected by the lower prism 46b is chopped by a disc 49 on shaft 48. The discs have arcuate portions 180° in length removed from their rims with the portions offset 90°. Accordingly, in each rotation of the shaft, one disc passes its beam for a 90° movement of the shaft, while the second beam is cut off. In the next 90° of movement of the shaft, both beams are passed by the discs, and, in the third 90° of movement, the first beam is cut off and the second is free to pass its disc. In the final 90° of shaft movement, both beams are cut off.

The beams passing discs 47 and 49 fall, respectively, on focusing mirrors 50 and 51 and the beams travel from the mirrors through respective cells 52, 53 and fall upon detector 22'. One of the cells contains a sample of the unknown and the other, the comparison, and the detector 22' is similar to detector 22, in that it generates a voltage in response to radiation falling thereon. The voltages generated by detector 22' are utilized in the same manner as shown in Fig. 3 and the instrument may be employed to make a record of the ratio of the absorption of the sample to that of the comparison, as above described.

The new instrument is shown in its simplest form in Fig. 8 as including a source S" of radiation, from which beams pass to cells 54, 55, one of which contains the unknown and the other, the comparison. The radiation transmitted through the cells falls upon focusing mirrors 56, 57 and the beam from mirror 56 is chopped by a disc 58 similar to disc 47, while the beam from mirror 57 is chopped by a disc 59 similar to disc 49. The beam chopped by disc 58 falls upon the upper part of a biprism 60 similar to biprism 46 and is thereby directed upon a detector 22", while the beam chopped by disc 59 is directed by the lower part of biprism 60 upon detector 22". The voltages generated by the detector are then amplified and utilized in the same manner as has been described above in connection with the instrument shown in Fig. 1.

In the instrument of Fig. 8, any appropriate means may be employed for isolating the desired narrow or broad portion of the spectrum of the radiation to be utilized. For this purpose, the source used may be one of suitable emission characteristics and the detector employed may have the desired spectral sensitivity. Filters may also be employed to cut off the radiation at upper and lower wave length limits, such filters being well known in the art.

Although the new instrument has been described as including mechanical rectification, it will be apparent the instrument may include, if desired, conventional electrical synchronous rectification from a signal derived from a generator driven by the motor driving the chopper means.

The instrument shown in Fig. 1 is similar to a standard single beam instrument except for changes in the chopper means, cell, and electronic portion of the instrument. The standard instrument may, accordingly, be converted to the new form by making the modifications indicated.

In all forms of the new instrument, the order of the components of the system between the source and detector is not important, since the chopping means may be placed anywhere in the train and each cell placed at any point where an image of its chopping disc is formed. Thus, instead of placing the disc and cells close together ahead of the entrance slit of the monochromator, as in the Fig. 1 instrument, the cells may be at the entrance to the monochromator and the disc at the exit. In an instrument operating with ultra-violet radiation, it is preferable to place both the cells and chopping means beyond the exit to the monochromator, as in the instrument shown in Fig. 5.

In the new instrument, the output of breaker A is proportional to the energy passing through the comparison cell and may be used for the operation of various auxiliary devices for improving the operation of the instrument.

We claim:

1. In an instrument of the type described, the combination of a detector responding to radiation falling thereon and producing a signal, means for causing radiation of two kinds to fall upon the detector successively in respective cycles 90° apart, each cycle having an off period longer than 90° and the detector producing a signal having components proportional in amplitude to the respective kinds of radiation, an amplifier for amplifying said signal, and a rectifying system receiving the amplified signal and including a pair of rectifiers operating at the frequency of said means, one of the rectifiers operating approximately in phase with the first component and 90° out of phase with the second and the other rectifier operating approximately in phase with the second component and 90° out of phase with the first, and filtering means removing undesired A. C. components from the rectified signals.

2. In an instrument of the type described, the combination of a detector responding to radiation falling thereon and producing a signal, means for causing radiation of two kinds to fall upon the detector in respective like cycles approximately 90° out of phase, each cycle having an off period longer than 90° and the detector producing a signal having components proportional in amplitude to the respective kinds of radiation, an amplifier for amplifying said signal, and a rectifying system receiving the amplified signal and including a pair of rectifiers operating at the frequency of said means, one of the rectifiers operating approximately in phase with the first component and 90° out of phase with the second and the other rectifier operating approximately in phase with the second component and 90° out of phase with the first, and filtering means removing undesired A. C. components from the rectified signals.

3. In an instrument of the type described, the combination of a detector responding to radiation falling thereon and producing a signal, means for causing radiation of two kinds to fall upon the detector in respective cycles 90° out of phase, each cycle having an on period and an off period, the on and off periods in each cycle being longer than 90° and the detector producing a signal having components proportional in amplitude to the respective kinds of radiation, an amplifier for amplifying said signal, and a rectifying system receiving the amplified signal and including a pair of rectifiers operating at the frequency of said means, one of the rectifiers operating approximately in phase with the first component and 90° out of phase with the second and the other rectifier operating approximately in phase with the second component and 90° out of phase with the first, and filtering means removing undesired A. C. components from the rectified signals.

4. In an instrument of the type described, the combination of a detector responding to radiation falling thereon and producing a signal, means for causing radiation of two kinds to fall upon the detector successively in respective cycles 90° out of phase, each cycle having an off period longer than 90° and the detector producing a signal having components proportional in amplitude to the respective kinds of radiation, an amplifier for amplifying said signal, a rectifying system receiving the amplified signal and including a pair of rectifiers operating at the frequency of said means, one of the rectifiers operating approximately in phase with the first component and 90° out of phase with the second and the other rectifier operating approximately in phase with the second component and 90° out of phase with the first, and filtering means removing undesired A. C. components from the rectifier signals, and recording means receiving the rectified signals and making a record in response thereto.

5. In an instrument of the type described, the combination of a detector responding to radiation falling thereon and producing a signal, means for causing radiation of two kinds to fall upon the detector successively in respective cycles 90° out of phase, each cycle having an off period longer than 90° and the detector producing a signal having components proportional in amplitude to the respective kinds of radiation, an amplifier for amplifying said signal, and a rectifying system receiving the amplified signal and including a pair of mechanical breakers operating at the frequency of said means, one of the breakers operating approximately in phase with the first component and 90° out of phase with the second and the other breaker operating approximately in phase with the second component and 90° out of phase with the first, and filtering means removing undesired A. C. components from the rectified signals.

6. In an instrument of the type described, the combination of a detector responding to radiation falling thereon and producing a signal, means for causing a pair of beams of respective different kinds of radiation to fall upon the detector, means for chopping the beams in respective cycles 90° out of phase, each cycle having an off period longer than 90° and the detector producing a signal having components proportional in amplitude to the radiation in the respective beams, an amplifier for amplifying the signal, and a rectifying system receiving the amplified signal and including a pair of rectifiers operating at the frequency of the chopping means, one of the rectifiers operating approximately in phase with the first component and 90° out of phase with the second and the other rectifier operating approximately in phase with the second component and 90° out of phase with the first, and filtering means removing undesired A. C. components from the rectified signals.

7. In an instrument of the type described, the combination of a detector responding to radiation falling thereon and producing a signal, means, including monochromating means, for causing narrow bands of wavelengths of radiation of two kinds to fall upon the detector out of phase in respective cycles 90° out of phase, each cycle having an off period longer than 90° and the detector producing a signal having components proportional in amplitude to the respective bands of radiation, an amplifier for amplifying the signal, and a rectifying system receiving the amplified signal and including a pair of rectifiers operating at the frequency of said means first-named, one of the rectifiers operating approximately in phase with the first component and 90° out of phase with the second and the other rectifier operating approximately in phase with the second component and 90° out of phase with the first, and filtering means removing undesired A. C. components from the rectified signals.

8. In an instrument of the type described, the combination of means for emitting radiation, a detector receiving radiation from said means and producing a signal in response thereto, a pair of cells lying in the path of radiation traveling from said emitting means to the detector and offset laterally, the cells being adapted to contain a sample to be analyzed and a comparison sample, respectively, a monochromator receiving radiation traveling from the emitting means toward the detector and passing a narrow band of wavelengths of said radiation, chopping means between the emitting means and detector operating cyclically to cut off the radiation and to pass radiation transmitted by the respective cells approximately 90° out of phase, whereby, in each cycle of the chopping means, the detector produces a signal having components proportional in amplitude to radiation transmitted by the respective cells, an amplifier for amplifying the signal, and a rectifying system receiving the amplified signal and including a pair of rectifiers operating at the frequency of the chopping means, one of the rectifiers operating approximately in phase with the first component and 90° out of phase with the second and the other rectifier operating approximately in phase with the second component and 90° out of phase with the first, and filtering means removing undesired A. C. components from the rectified signals.

9. In a spectrophotometer, the combination of a source of radiation, a detector responding to radiation falling thereon and producing a signal, a pair of cells adapted to contain samples to be compared and lying in the path of radiation traveling from the source to the detector, the cells being offset laterally, means between the source and the detector for chopping the radiation, said chopping means operating in cycles, each of which includes the steps of cutting off radiation and passing radiation transmitted by the respective cells, whereby, in each cycle of the chopping means, the detector produces a signal having components proportional in amplitude to radiation transmitted by the respective cells, an amplifier for amplifying the signal, and a rectifying system receiving the amplified signal and including a pair of rectifiers operating at the frequency of the chopping means, one of the rectifiers operating approximately in phase with the first component and 90° out of phase with the second and the other rectifier operating approximately in phase with the second component and 90° out of phase with the first, and filtering means removing undesired A. C. components from the rectified signals.

10. In a spectrophotometer, the combination of a source of radiation, a detector responding to radiation falling thereon and producing a signal, a pair of cells adapted to contain samples to be compared and lying in the path of radiation traveling from the source to the detector, the cells being offset laterally, means between the source and the detector for chopping the radiation, said chopping means operating in cycles, each of which includes the steps of cutting off radiation and passing radiation transmitted by the respective cells approximately 90° out of phase, whereby, in each cycle of the chopping means, the detector produces a signal having components proportional in amplitude to radiation transmitted by the respective cells, an amplifier for amplifying the signal, and a rectifying system receiving the amplified signal and including a pair of rectifiers operating at the frequency of the chopping means, one of the rectifiers operating approximately in phase with the first component and 90° out of phase with the second and the other rectifier operating approximately in phase with the second component and 90° out of phase with the first, and filtering means removing undesired A. C. components from the rectified signals.

11. In an instrument of the type described, the combination of a pair of cells adapted to contain samples of a standard and an unknown, respectively, a detector responsive to radiation falling thereon, means, including a source of radiation, for causing separate beams of radiation to travel along different paths through respective cells and fall upon the detector, and means for interrupting the beams in respective cycles 90° out of phase, each cycle having an off period longer than 90°.

12. In an instrument of the type described, the combination of a pair of cells adapted to contain samples of a standard and an unknown, respectively, means, including a source of radiation, for causing separate beams of radiation to travel along different paths through respective cells and to be combined into a single beam, a monochromator receiving said single beam and dispersing said beam, said monochromator having an exit slit for passing a narrow band of wavelengths of said dispersed beam, a detector receiving radiation issuing through the exit slit and responding to said radiation, and means for interrupting said separate beams in respective cycles 90° apart, each cycle having an off period longer than 90°.

13. An instrument of the type described, the combination of a pair of cells adapted to contain samples of a standard and an unknown, respectively, a detector responsive to radiation falling thereon, means, including a source of radiation, for causing separate beams of radiation to travel along different paths through respective cells and fall upon the detector, and means for interrupting the beams in respective cycles 90° out of phase, each cycle having an on period and an off period both longer than 90°.

14. In an instrument of the type described, the combination of a pair of cells adapted to contain samples of a standard and an unknown, respectively, means, including a source of radiation, for causing separate beams of radiation to travel along different paths through respective cells and be combined into a single beam, a monochromator receiving said single beam and dispersing said beam, said monochromator having an exit slit for passing a narrow band of wavelengths of the dispersed beam, a detector receiving radiation issuing through said exit slit and responding to said radiation, and means for interrupting the separate beams in respective cycles 90° out of phase, each cycle having an on period and an off period both longer than 90°.

References Cited in the file of this patent

UNITED STATES PATENTS

| Number | Name | Date |
|---|---|---|
| 1,999,023 | Sharp et al. | Apr. 23, 1935 |
| 2,287,808 | Lehde | June 30, 1942 |
| 2,359,734 | Hood | Oct. 10, 1944 |

(Other references on following page)

UNITED STATES PATENTS

| Number | Name | Date |
|---|---|---|
| 2,395,489 | Major et al. | Feb. 26, 1946 |
| 2,439,373 | Stearns | Apr. 6, 1948 |
| 2,442,910 | Thomson | June 8, 1948 |
| 2,483,746 | White | Oct. 4, 1949 |
| 2,503,165 | Meyer | Apr. 4, 1950 |
| 2,528,924 | Vassy | Nov. 7, 1950 |
| 2,547,212 | Jamison et al. | Apr. 3, 1951 |
| 2,549,402 | Vossberg | Apr. 17, 1951 |

FOREIGN PATENTS

| Number | Country | Date |
|---|---|---|
| 584,506 | Great Britain | Jan. 16, 1947 |

OTHER REFERENCES

Kivenson et al., "An Infra-Red Chopped-Radiation Analyzer," pages 1086 through 1091, vol. 38 of Journal of the Optical Society of America, December 1948.

Kivenson, "Some Considerations in the Design of Double-Beam Analyzers for Industrial Control," pages 112 through 118, Journal of the Optical Society of America, vol. 40, February 1950.